(No Model.)
G. GOEWEY.
PROCESS OF AGING AND PURIFYING WHISKY.
No. 257,489. Patented May 9, 1882.
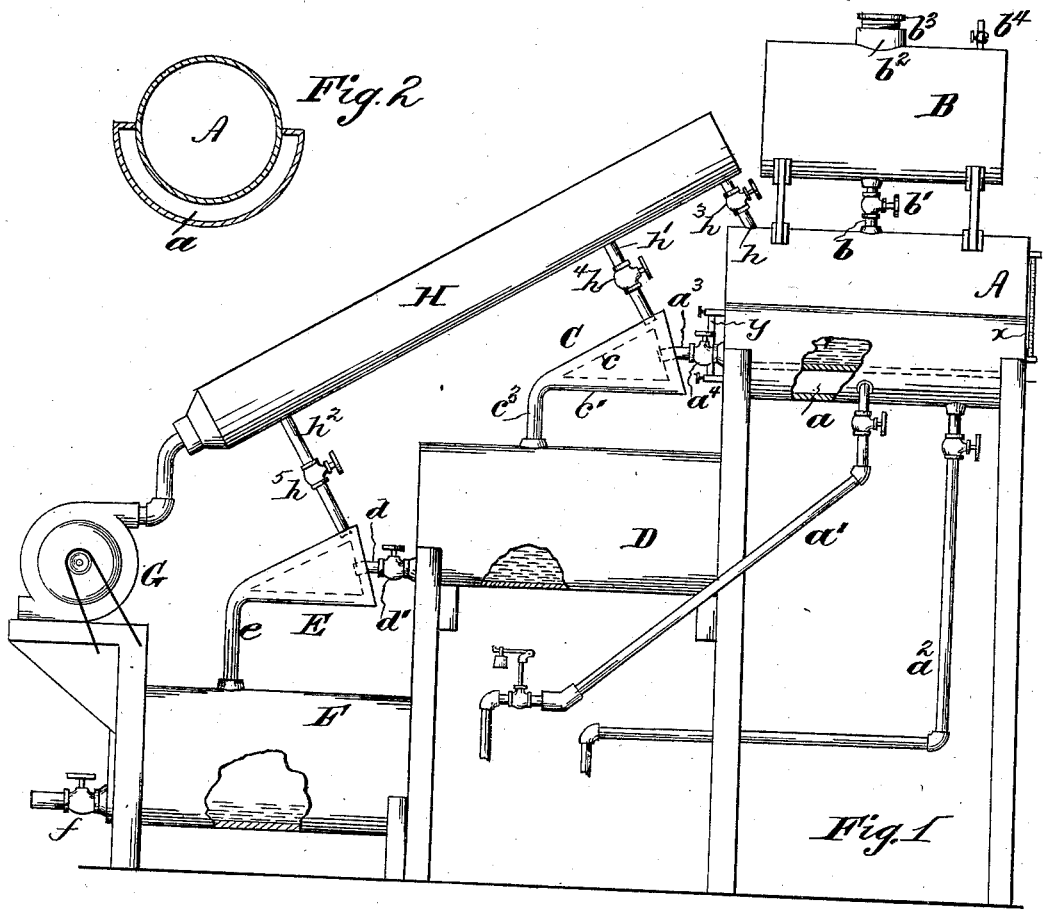
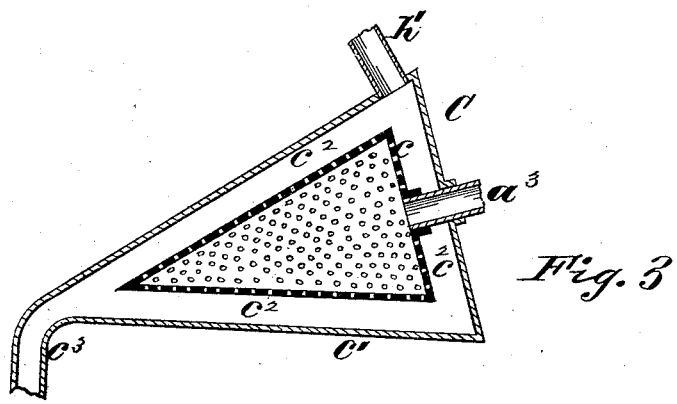
WITNESSES:
William Martin
Albert Lofton
INVENTOR
George Goewey.

UNITED STATES PATENT OFFICE.

GEORGE GOEWEY, OF PHILADELPHIA, PENNSYLVANIA, ASSIGNOR OF ONE-HALF TO WILLIAM W. THOMASON, OF SAME PLACE.

PROCESS OF AGING AND PURIFYING WHISKY.

SPECIFICATION forming part of Letters Patent No. 257,489, dated May 9, 1882.

Application filed May 5, 1881. (No model.)

*To all whom it may concern:*

Be it known that I, GEORGE GOEWEY, a citizen of the United States, resident at Philadelphia, in the county of Philadelphia and State of Pennsylvania, have invented a new and Improved Process of and Apparatus for Aging and Purifying Whisky or other Spirituous Liquors, of which the following is a specification, reference being had to the accompanying drawings, wherein—

Figure 1 is a side elevation, partly in section, of mechanism suitable for practicing my invention, and Figs. 2 and 3 are detail sections of parts of the same.

My invention has relation to an improved method for aging and purifying whisky or other spirituous liquors; and my invention has for its object to provide a method for such purpose whereby the whisky or other liquor is aged and purified to a greater extent in a shorter time and at less expense than can be accomplished by the methods heretofore used.

My invention accordingly consists in heating the whisky or liquor to a temperature not exceeding 182° Fahrenheit, and when so heated applying pressure thereto to force it to and through an atomizer, whereby the whisky is broken up into atoms or particles, each such atom or particle then coming into contact or commingling with atmospheric air, said air and whisky then being passed through a succession of temperature-reducing vessels and atomizers, to be again repeatedly broken up or atomized and brought into contact with or caused to commingle with fresh or new supplies of atmospheric air until said whisky is reduced in temperature or sufficiently cooled, whereupon the commingled air is allowed to escape or pass away from the whisky when the latter is conducted from the last temperature-reducing vessel to its retaining-barrel or other receptacle.

In the accompanying drawings I have shown mechanism for carrying my improved method into effect; but I do not limit myself thereto, as other and varied means may be employed for practicing my invention.

Referring thereto, A represents a vessel in which the charge or charges of whisky are heated by steam admitted to a jacket, $a$, which extends half-way around said vessel, as plainly shown in Fig. 2, $a'$ being the steam-supply pipe for said jacket, and $a^2$ the pipe for conducting away the water of condensation.

Above vessel A is a supply-tank, B, and $b$ is a pipe connecting said vessel and tank, and is provided with a cock, $b'$. The tank B is furnished with a pouring-in pipe, $b^2$, having a screw or other suitable stopple, $b^3$, and is also provided with an air-cock, $b^4$. If desired, the pipe $b^2$ may have a valve instead of a stopple, as shown, in which case the air-cock $b^4$ is dispensed with.

C is what I call an "atomizer," and consists of an interior perforated vessel, $c$, and an exterior enlarged shell, $c'$, so that when said parts are juxtaposited a space, $c^2$, between them will be formed, as shown in Fig. 3. Said space extends around on all sides of the perforated vessel $c$, and is provided with means to permit the introduction of air thereto, for purposes hereinafter more fully set forth. The perforated vessel $c$ has pipe-connection $a^3$ with vessel A, said pipe being provided with a cock, $a^4$.

The shell $c'$ terminates in a tube, $c^3$, which enters a receptacle, D. The latter has no steam-jacket, and is simply a tank or receptacle for receiving the whisky from the atomizer and causing the same to spread itself over an enlarged area of space for the purpose of facilitating the cooling of such whisky. Consequently I call such receptacles "temperature-reducing vessels."

From vessel D leads a pipe, $d$, provided with valve $d'$ and terminating in atomizer E. The latter being constructed like atomizer C, as above described, needs no further description, its outlet-pipe $e$ entering temperature-reducing vessel F, of like construction as that of vessel D.

G is a fan suitably located, and H is an air duct or pipe leading therefrom, having branches $h\ h'\ h^2$, provided with cocks $h^3\ h^4\ h^5$, respectively. The branch $h$ terminates in the top of the heating-vessel A, while pipes $h'\ h^2$ connect respectively with the shells of the atomizers C and E, so that air from pipe H will be conducted by said tubes $h'$ $h^2$ to the air-spaces surrounding the perforated vessels in said atomizers.

The operation is as follows: The first charge of whisky or other spirituous liquor is poured into vessel A until the latter is nearly full, thereby leaving a space between the top of said vessel and the surface of the whisky. The cock $a^4$ having been previously closed to cut off communication with atomizer C, the cocks $h^3$ and $b'$ are then closed, and steam is admitted to jacket $a$, and said liquor is heated to a temperature not exceeding 182° Fahrenheit. As soon as such liquor is sufficiently heated, which may be ascertained by an inspection of the thermometer $x$, affixed to vessel A, the cock $h^3$ is opened and the fan G operated, whereupon air from pipe H passes through pipe $h$ and enters space in vessel A above the liquor, provided for that purpose, as above set forth, and collects above said liquor until sufficient pressure is obtained to force the whisky to and through atomizer C, whereupon the cocks $a^4$, $d'$, $h^4$, and $h^5$ are opened. The heated whisky in vessel A is then gradually forced out of said vessel by such air-pressure above it, and passes through pipe $a^3$ into and through the perforated vessel $c$ of atomizer C. As the whisky emerges from the perforations in said vessel $c$ it is finely divided or is in an atomized condition, and each atom comes directly into contact or commingles with atmospheric air in the space $c^2$ of said atomizer, said air being supplied thereto by pipe $h'$. Such whisky atoms, so commingling with such air, are acted on by the latter to cause them to become aged and purified; and as a continuous supply of air is passed to said atomizer the succeeding atoms of whisky come into contact with new or fresh air. Hence each particle of whisky is acted upon by such air to effect a more speedy and thorough aging and purifying thereof than would be the case if the whisky were presented to the air in bulk or in an unseparated condition. Said commingled air and whisky pass out of atomizer C through pipe $c^3$ and enter the vessel D, wherein the whisky is spread over considerable area, so that its temperature is quickly lowered as it passes therethrough under the combined influence of gravity and the air-pressure from pipe $h'$, and enters atomizer E, in which said whisky is again broken up or atomized, and in such condition comes again into contact or commingles with a fresh or new supply of atmospheric air passing into said atomizer from pipe $h^2$. Said whisky and its freshly-commingled air then pass into temperature-reducing vessel F to further cool, and said whisky, when sufficiently lowered in temperature to such extent that its vapors are condensed, is then allowed to pass off from vessel F through cock $f$ to a barrel or other receptacle. As said whisky emerges from cock $f$ its commingled air passes into the surrounding atmosphere, and being cold air, and the whisky also being cooled, said air carries with it only the natural vapors of the whisky; hence the strength of the latter is not reduced.

It will be noticed that the whisky, after leaving the heating-vessel A, passes uninterruptedly through each succeeding atomizer and temperature-reducing vessel.

It will also be noticed that said whisky is heated only in the first vessel. The air-pressure therein is employed to force or remove the heated whisky therefrom only, said air never passing out with such whisky. To prevent the latter lowering itself to or below the orifice of pipe $a^3$, and thereby permitting the escape of said air from vessel A, a gage, $y$, is affixed to said vessel, so that the operator can always see the height of the liquor in said vessel and tell when a fresh supply is necessary. When such is the case the cocks $h^3$ and $a^4$ are closed, and the tank B having previously been filled with a charge of whisky and its stopple or cock $b^3$ closed, the cock $b'$ is then opened. The heated air under pressure in vessel A then passes up through pipe $b$ into tank B, displacing the whisky therein and causing it to flow into vessel A. Said heated air, as it enters tank B, passes through the liquor therein and partially heats the same, so that when the latter reaches vessel A less time is required to heat said liquor to raise it to a temperature not exceeding 182° Fahrenheit. Said air so parting with its heat, any fumes of whisky it may have absorbed in vessel A are condensed and taken up by the whisky in tank B. After the latter is so emptied the valve $b'$ is closed and the cock $b^4$ opened to permit the escape of air from tank B, or such operation may be performed previously to the refilling of the said vessel with the succeeding supply of whisky. Such fresh charge in vessel A is heated, as above described, whereupon the cocks $h^3$ $a^4$ are again opened, and air from pipe H again enters vessel A to force said liquor therefrom to and through atomizer C, and so on, as above set forth. During such filling operation the passage of the whisky through vessels D and F and atomizer E continues, as the said liquor will not leave vessel D as fast as it enters the same. Consequently by the time the second or succeeding charge of whisky supplied to vessel A is heated sufficiently and permitted to pass to atomizer C it reaches and passes through the latter just as the last remains of the former charge are escaping from vessel D; hence the operation is in a measure a continuous one.

Any number of temperature-reducing vessels and atomizers may be employed, the number used depending upon the amount of age and purity designed to be imparted to the liquor treated. The greater the age and purity sought for the larger the number of such vessels and atomizers used, for it is evident that the more the whisky is so atomized and is in such state repeatedly commingled with fresh atmospheric air the greater will be its age and purity.

Instead of using an air-pressure to remove the liquor from vessel A, a plunger may be substituted therefor and operated by any suitable mechanism; or said vessel may be so constructed that the gravity of the liquor will produce sufficient pressure for such removal. So, too, if desired, the air passing through pipes $h'$ $h^2$ may be refrigerated before entering the atomizers, whereby a less number of the vessels D and F and atomizers will be required to effect the aging and purifying of such liquor, for such refrigerated air, commingling with the atoms of whisky, acts more speedily and effectively thereon to accomplish their aging and purifying than it would do if brought into contact with said whisky atoms at the natural atmospheric temperature.

I do not broadly claim the breaking up or atomizing whisky or other spirituous liquors, and then in such state commingling it or causing it to come into contact with atmospheric air. Such is shown in my former application filed in the United States Patent Office, and allowed December 11, 1880.

What I claim as my invention is—

1. The method of aging and purifying whisky or other spirituous liquors by heating the same to a temperature not exceeding 182° Fahrenheit, applying pressure thereto to produce atomization of said liquor, and commingling said atoms with atmospheric air, said liquor and air being then successively atomized and brought into contact with new or fresh supplies of atmospheric air and repeatedly spread over cooling-surfaces between each such atomization, until it is sufficiently cooled, whereupon it is conducted to a retaining vessel or barrel in such manner as to permit of the escape of its commingled air, substantially as described.

2. In an apparatus for aging and purifying whisky or other spirituous liquors, the combination of the following instrumentalities: a heating-vessel, a successive series of temperature-reducing vessels, the latter being provided with atomizers, and means for supplying said atomizers with continuous supplies of atmospheric air, said parts being arranged substantially as shown and described.

In testimony that I claim the foregoing I have hereunto set my hand this 29th day of April, A. D. 1881.

GEORGE GOEWEY.

Witnesses:
ERNEST W. MCILWAIN,
EDWARD HAUGH.